United States Patent
Kaushik et al.

(10) Patent No.: US 8,594,064 B2
(45) Date of Patent: Nov. 26, 2013

(54) MODE STEERING IN A WIRELESS COMMUNICATION NETWORK

(75) Inventors: Anil Kaushik, Bangalore (IN); Hari Sharma, Bangalore (IN)

(73) Assignee: Motorola Solutions, Inc., Schaumburg, IL (US)

( * ) Notice: Subject to any disclaimer, the term of this patent is extended or adjusted under 35 U.S.C. 154(b) by 442 days.

(21) Appl. No.: 13/050,409

(22) Filed: Mar. 17, 2011

(65) Prior Publication Data

US 2012/0236836 A1 Sep. 20, 2012

(51) Int. Cl.
*H04W 4/00* (2009.01)

(52) U.S. Cl.
USPC ........ 370/338; 370/431; 455/435.2; 455/450; 709/228

(58) Field of Classification Search
None
See application file for complete search history.

(56) References Cited

U.S. PATENT DOCUMENTS

| | | | |
|---|---|---|---|
| 6,295,450 B1 * | 9/2001 | Lyer et al. | 455/436 |
| 2005/0060319 A1 * | 3/2005 | Douglas et al. | 707/10 |
| 2007/0160017 A1 * | 7/2007 | Meier et al. | 370/338 |
| 2007/0217360 A1 | 9/2007 | Tang | |
| 2007/0258384 A1 * | 11/2007 | Sammour et al. | 370/252 |
| 2008/0123607 A1 * | 5/2008 | Jokela | 370/338 |

FOREIGN PATENT DOCUMENTS

GB 2472595 A 2/2011

OTHER PUBLICATIONS

International Search Report and Written Opinion for International Patent Application No. PCT/US2012/026488 mailed on Jun. 12, 2012.
Issac, B., "Study of Mixed Mode Scenarios with IEEE 802.11 Networks and Bluetooth Network," IEEE Symposium on Industrial Electronics and Applications, pp. 319-324, Oct. 4-6, 2009.
Cisco Systems, "Capacity, Coverage, and Deployment Considerations for IEEE 802.11G," pp. 1-7.
3Com Network Solutions—"3COM Wireless LAN Managed Access Point (MAP)3950"—Data Sheet—Jan. 2010—5 pages.

* cited by examiner

*Primary Examiner* — Brian Roberts
(74) *Attorney, Agent, or Firm* — Brian M. Mancini (57) ABSTRACT

Mode steering in a wireless communication network includes configuring a list of neighboring access points and their operational modes. If an operational mode of a requesting mobile device can not be supported by the access point, denying the association. If an operational mode of a requesting mobile device matches a highest operational mode of the access point, allowing the association. If the operational mode of the mobile device is not the same as the highest operational mode of the access point, and if any neighboring access point has an available operational mode matching that of the mobile device, denying the association, so as to steer the requesting mobile device to the matching neighboring access point.

19 Claims, 4 Drawing Sheets

| NEIGHBOR AP | OPERATING MODES | THRESHOLD | CLIENT LOAD |
|---|---|---|---|
| 1 | n | n/a | 100% |
| 2 | n | n/a | 80% |
| 3 | b/g | 50% | 100% |
| 4 | b/g/n | 50% | 20% |

*FIG. 4*

| AP MAC ADDRESS | RADIO 1 MODE | RADIO 2 MODE | RADIO 3 MODE |
|---|---|---|---|
| xx:xx:xx:xx:xx:xx | a | n | - |

*FIG. 5*

| AP MAC ADDRESS | RADIO 1 MODE | RADIO 2 MODE | RADIO 3 MODE |
|---|---|---|---|
| xx:xx:xx:xx:xx:xx | a | g/n | - |

*FIG. 6*

MODE STEERING IN A WIRELESS COMMUNICATION NETWORK

FIELD OF THE DISCLOSURE

The present invention relates generally to wireless communication networks and more particularly to operational mode steering for access points in a wireless communication network.

BACKGROUND

Wireless communication networks, such as wireless wide-area network or wireless local-area networks (WLAN) such as IEEE 802.11 wireless communication networks are able to provide communications for their users utilizing wireless access support through local access points. The access points serve to transfer communication traffic between a communication device in a local wireless domain to a backhaul connection, such as the internet for example. In particular, an Access Point (AP) and a switch of the network takes communications with the communication device and from there the communications can be routed to a wired, or another wireless, domain.

As in any communication network, there is always a need to support older, legacy devices that are operable using older technologies, while introducing newly evolving technologies. For example, IEEE 802.11 based systems originated with IEEE 802.11b CCK (Complementary Code Keying) based systems which then evolved to IEEE 802.11g/a OFDM (Orthogonal Frequency Division Multiplexing) based systems. There was tremendous effort in the IEEE 802.11g/a implementation to provide backward compatibility to IEEE 802.11b systems. Now the even newer IEEE 802.11n specification must also deal with the legacy IEEE 802.11a/b/g systems. Therefore, the access points of a WLAN network need to support many devices operable on different system.

Considering a practical scenario, IEEE 802.11g access points need to support IEEE 802.11b mode devices and now IEEE 802.11n access points need to support both IEEE 802.11b and IEEE 802.11g/a mode devices. The need to provide all of this "mixed-mode" support, and all the necessary communication overhead, tends to lower overall network throughput. This problem will continue to exist in the future when there is new protocol like IEEE 802.11n++ (Gigabit Wi-Fi Alliance) that would need to support three previous legacy systems.

One solution to the problem has been to simply limit legacy client support on access points by static configuration. However, this is very inefficient and difficult to implement, one access point at a time. In addition, there is chance of a legacy mobile device being unable to obtain service due to the absence of a nearest access point providing the necessary legacy service. Another solution is to implement load balancing across frequency bands of a dual-band access point. However, this solution does not address mixed-mode system operation within multiple access points.

Accordingly, there is a need for new techniques to alleviate mixed-mode operations in a wireless communication network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides novel techniques to manage mixed-mode operations in a wireless communication network. In particular, the present invention defines a dynamic algorithm to alleviate mixed-mode operation for a portion of a group of access points constituting a communication network. Specifically, the present invention distributes legacy clients among the access points of the network to avoid mixed-mode system operation among a subset of access points wherever possible. In effect, the present invention ensures that legacy clients are not distributed among all the access points in the network, leaving some access points working in only a single operation mode as much as possible. The legacy clients are then limited to particular access points that are dedicated to mixed-mode operation. Leaving some access points to operate in only one operational mode increases overall network throughput, due to the reduction of communication overhead required for mixed-mode operation. The actual distribution among the access points is based on the number and type of operational modes of the mobile devices and access points in the network.

Although the present invention is described herein in terms of an IEEE 802.11 wireless communication network, it should be recognized that the present invention is not limited to an IEEE 802.11 a/b/g and n client distribution, but it is generic where emphasis is on keeping an access point operating in highest throughput operational mode as long and as non-mixed as possible. For example, the present invention can limit the association of legacy IEEE 802.11b clients to only a few access points in a local-area network in those scenarios where there are access points in the network utilizing IEEE 802.11g protocols. Similarly, legacy IEEE 802.11a/b/g clients will be limited to only a few access points in the network in those scenarios where there are access points in the network utilizing IEEE 802.11n protocols. In the future, legacy IEEE 802.11a/b/g/n clients will be limited to only a few access points in the network in those scenarios where there are access points in the network utilizing IEEE 802.11n++ protocols. In any of these scenarios, the remaining access points will operate in a single mode, which is preferably the highest throughput mode, leaving the few mixed-mode access points to serve the legacy clients. The ratio of access points running in single-mode or mixed mode depends on the number of mobile devices and access points operable in any particular mode, but it is envisioned that most of the access points would be running in single-mode.

Figure 1:
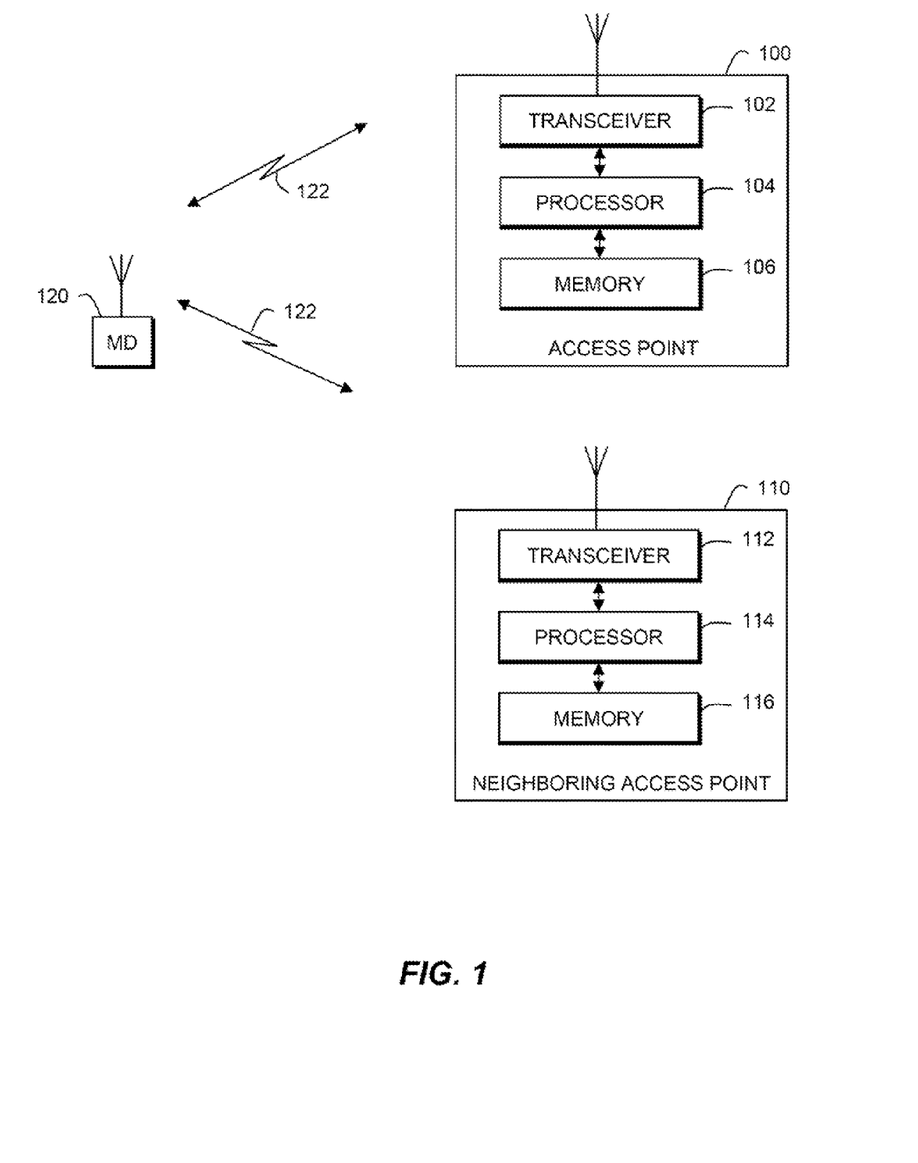
FIG. 1 is a simplified block diagram of a communication network, in accordance with the present invention.

FIG. 1 is a block diagram depiction of one embodiment of the present invention utilizing a wireless local-area communication network, including IEEE 802.11 wireless communication systems, as the example described herein. However, it should be recognized that the present invention is also applicable to other wireless communication systems. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for such wireless telecommunications systems. The communication system represents a system operable in a network that may be based on different wireless protocols. For example, the description that follows can apply to a wireless wideband area network or other network, employing wireless technologies such as IEEE's 802.11, 802.16, or 802.20, modified to implement embodiments of the present invention.

Referring to FIG. 1, there is shown a block diagram of wireless communication network having a plurality of access points 100, 110 that include an access point (AP) 100 adapted to support the inventive concepts of the preferred embodiments of the present invention. Those skilled in the art will recognize that FIG. 1 does not depict all of the network equipment necessary for system to operate but only those system components and logical entities particularly relevant to the description of the embodiments herein. For example, an access point, eNodeB, or base station can be connected with or comprise one or more devices such as wireless area network stations (which include access nodes (ANs), Media Access Controllers (MAC), AP controllers, and/or switches), base transceiver stations (BTSs), base site controllers (BSCs), packet control functions (PCFs), packet control units (PCUs), and/or radio network controllers (RNCs). However, none of these other devices are specifically shown in FIG. 1.

AP 100 is depicted in FIG. 1 as comprising a processor 104 coupled to a transceiver 102 and memory 106. In general, components such as processors, memories, and transceivers are well-known. For example, the transceiver 102 is operable to communicate with user devices over an IEEE 802.11 interface. In addition, AP processing units are known to comprise basic components such as, but not limited to, microprocessors, microcontrollers, memory cache, application-specific integrated circuits (ASICs), and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement an AP processor that performs the given logic. Therefore, AP 100 represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the AP aspect of the present invention may be implemented in any of the devices listed above or distributed across such components.

The AP 100 uses a local area wireless interface for communication with at least one mobile device 120 (MD) and at least one neighboring AP 110 that includes its own transceiver 112, processor 114, and memory 116, similar to those of AP 100. The local area wireless interface 122 corresponds to a forward link and a reverse link used in communications between the MD and the APs. Mobile devices or remote unit platforms are known to refer to a wide variety of consumer electronic platforms such as clients, mobile stations, mobile nodes, user equipment, user stations, subscriber equipment, subscriber stations, access terminals, remote terminals, terminal equipment, gaming devices, personal computers, and personal digital assistants, and the like, all referred to herein as mobile devices. In particular, each mobile device comprises a processor that can be coupled to a transceiver, antenna, a keypad, a speaker, a microphone, and a display, as are known in the art and therefore not shown.

APs and MDs are known to comprise basic components such as, but not limited to, microprocessors, digital signal processors (DSPs), microcontrollers, memory devices, application-specific integrated circuits, and/or logic circuitry. Such devices are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm, a logic flow, a messaging/signaling flow, a call flow, and/or a protocol specification, those skilled in the art are aware of the many design and development techniques available to implement user equipment that performs the given logic.

An embodiment of the present invention introduces the concept of operational mode steering for a wireless communication network, such as a wireless local area network operable under various IEEE 802.11 protocols for example. As used herein, each of the various IEEE 802.11 protocols, such as IEEE 802.11b/g/a/n, are referred to as operational modes, wherein those APs that are currently serving MDs using different operational modes (e.g. both "b" and "n") are operating in mixed mode, and those APs that are currently supporting MDs using only one operational mode (e.g. "n") are operating in a single mode. It is preferred that APs operate in only one, highest throughput mode (e.g. if AP is capable of supporting operational mode b, g, n, AP should operate in "n" mode since "n" is the highest throughput mode) in order to avoid overhead messaging and protocol configuration messaging, which reduce network throughput and effective performance.

The present invention provides a dynamic technique to avoid mixed mode operation for a subset of APs in a network. The technique ensures that, as much as possible, legacy MDs are not distributed to all APs, and should be associated to only a portion of the total number of APs in the network to avoid all APs working in mixed mode. The present invention takes into account the actual distribution and loading of MDs among the APs in the network. The present invention can be used to distribute legacy MDs for future protocols as well to avoid any mixed mode operation wherever possible. The present invention is not limited to legacy (e.g. IEEE 802.11b/g/a) MD distribution but it is generic and extendable where emphasis is on keeping the AP operating in the highest throughput single mode such that the AP does not need to configure itself with lower throughput operational modes whenever it is possible.

In practice, the present invention will limit the association of older, legacy MDs, such as MDs operating with an IEEE 802.11b protocol to only a few network APs in those scenarios where the network has APs operable using a higher throughput IEEE 802.11g protocol. Similarly, the present invention will limit the association of older, legacy MDs, such as MDs operating with any of the IEEE 802.11b/g/a protocols to only a few network APs in those scenarios where the network has APs operable using the current IEEE 802.11n protocol. In the future, the present invention will limit the association of legacy MDs, such as MDs operating with any of the IEEE 802.11b/g/a/n protocols to only a few network APs in those scenarios where the network has APs operable using a future IEEE 802.11n++ protocol. In this way the present invention, ensures that most of the APs are running with a network protocol having the highest available throughput, but still serving legacy clients without significant impact.

As used herein, "mode" refers to the supported operational protocol on a radio transceiver of an AP, such as IEEE 802.11b, etc. "MD Type" refers to an MD that is operable using a particular mode. This information can be deciphered from messaging from the MD, including any one or more of: a probe request, authentication, association requests, and the like from the MD. Similarly, "AP Type" refers to the supported operational mode on an AP and neighboring APs. This can be deciphered from the beacons, probe responses, association responses, and the like, and from the capability information published by individual AP's in specified frames of these communications. Neighbor APs could use wired side communication as well to inform its operating mode to other APs, and listen to beacon and probe response of other APs as well.

Figure 5:
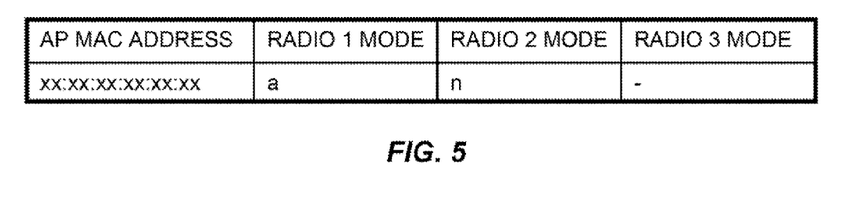
FIG. 5 is a representation of single operation modes of an access point, in accordance with the present invention.

Initially, a memory 106, 116 of the APs is configured to default operations mode values per AP, identified by its media access control (MAC) address. For example, a dual radio AP can be operable in IEEE 802.11a and IEEE 802.11n modes, as shown in FIG. 5. Each radio will set its operating mode to the highest available mode initially (e.g. if the radio is capable of supporting "b" and "g" modes, the radio will set its mode to "g" which is the higher throughput mode) The memory also needs to be configured with a list of an AP's neighboring APs and their operational modes. The list can be compiled and maintained by each AP listening for information being broadcast by its neighboring APs.

Figure 4:
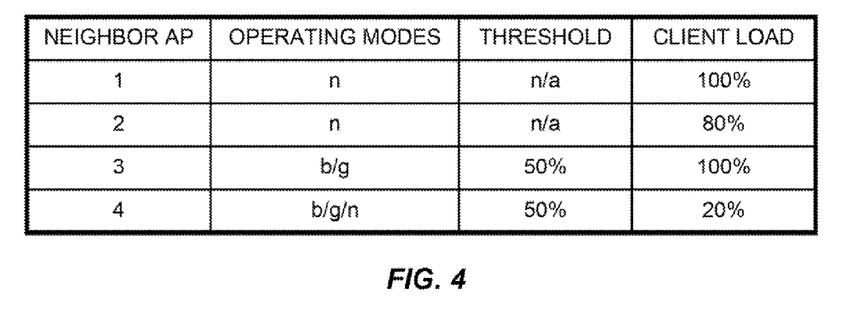
FIG. 4 is a representation of a list of neighboring access points, in accordance with the present invention.

Referring to FIG. 4, the table will include which neighboring APs are currently operating using which operational modes. For example, an AP may detect signals from four neighboring APs, 1 through 4. From listening to communications from these four neighboring APs, the AP 100 can determine that neighboring AP 1 and AP 2 are operating in a single mode utilizing only the latest IEEE 802.11n protocol, AP 3 is operating in mixed mode utilizing the legacy IEEE 802.11b protocol and the legacy IEEE 802.11g protocol, whereas AP 4 is operating in mixed mode utilizing the legacy IEEE 802.11b protocol and the legacy IEEE 802.11g protocol, and the current IEEE 802.11n protocol. This can also happen through a wired side interface if APs are interconnected.

However, it is not sufficient to know that an AP could support legacy MDs, when it could be that the AP may not want to support more legacy MDs. Therefore, it would be beneficial to determine if any of these neighboring APs is "available" to support legacy MDs. Being "available" is defined herein in two different ways, knowing an AP's client loading and a threshold for that loading, or knowing an AP's "reachability" as will be detailed below.

For example, each table can include a threshold and a client load for the neighboring APs, wherein if a neighboring AP is already supporting a number of legacy MDs (i.e. client load), and if this client load exceeds an acceptable threshold that the AP has set for itself, then this neighboring AP should not be considered as a likely candidate for a legacy MD support, i.e. it is not "available." Referring again to FIG. 4, if an AP is faced with an MD operating in the legacy IEEE 802.11b protocol, the AP can deny association of the MD if a neighboring AP can be found that could accommodate the MD. In this example, neighboring AP 1 is operating in single "n" mode with the addition that it is operating at full client load so it is not a likely candidate to accommodate the MD. AP 2 is operating in single "n" mode so it is also not a likely candidate to accommodate the MD even though it has available client load. AP 3 is operating in mixed mode that could accommodate the MD. However, its client load far exceeds its threshold so it ultimately can not accommodate the MD. AP 4 can accommodate the MD since it is operating in mixed mode and its client load is less than its threshold. Since AP 4 is available, the AP can deny the association of the MD, and leave the MD to search for AP 4, effectively steering the MD to AP 4.

In the other example, AP "reachability" is used to determine whether or not an MD could be supported by a mixed mode neighbor AP, in case the current AP is operating in non mixed mode. An AP is "reachable" by an MD if pre-authentication messages can be exchanged between the MD and any AP. For example, upon the MD associated with an AP 100, the MD can do a scan, either actively or passively, to find other AP's in its vicinity. The MD can send a pre-authentication message to those found neighbor AP's, which can be done either periodically or based on a need for future handover due to a tendency to roam. Even so, the MD will still remain associated with its original serving AP 100 during this pre-authentication stage. The MD can then send a message to its serving AP 100, or the serving AP 100 can detect for itself, any responses to the pre-authentication messages from the neighboring APs, which indicates that these particular neighboring APs are "reachable" as handover candidates for a legacy MD. This information can be stored and updated in the table, and then later used to confirm an "available" candidate for any legacy MD support.

Referring back to FIG. 1, in a first embodiment, the present invention introduces a concept of Connection Time Mode Steering, which refers to a technique wherein an AP tries its best to maintain its operating mode in a single (highest throughput operating mode), non-mixed mode. In effect, the AP steers legacy clients to attach to another AP already operating in mixed mode. This technique mainly applies when an AP 100 receives an association request from an MD 120, whereupon the AP makes a decision whether or not to allow the association based on its current operational state and the availability of at least one neighboring AP that could support the requesting MD.

From the association request received by the transceiver 102, the processor 104 of the AP 100 is able to determine an operational mode of the MD 120. If the operational mode of the mobile device does not match any operational mode of the access point, obviously the AP can not support the MD and the processor 104 will deny or disallow the association. Of course, if the operational mode of the mobile device matches a highest throughput operational mode of the AP, which is the optimum operating condition, the processor 104 of the AP 100 will allow the association.

However, if the operational mode of the mobile device is a lower throughput operational mode than the highest throughput operation mode of the AP, which is undesirable, and if any neighboring access point has an operational mode matching the operational mode of the mobile device and is operating in at least two different (mixed) operational modes, the processor 104 of the AP 100 can deny or disallow the association. Denying or disallowing an association is used for providing an opportunity for an MD to associate with a neighbor AP 110, since the AP 100 knows that there is another AP in the network that can support that MD. Optionally, the AP 100 can also determine whether the neighboring AP 110 is "available", as defined herein, wherein if the neighboring AP 110 is "available" proceeding to deny or disallow an association.

Figure 6:
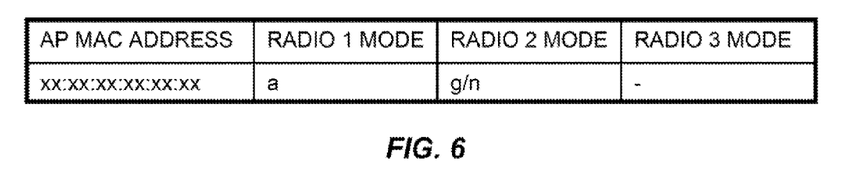
FIG. 6 is a representation of mixed operation modes of an access point, in accordance with the present invention.

Otherwise the processor 104 of the AP 100 allows the association with the MD 120. In other words, if the operational mode of the mobile device is a lower throughput operational mode than the highest throughput operation mode of the AP, and if no neighboring AP has an operational mode matching the operational mode of the mobile device and is operating in at least two different operational modes 214, (or if the neighboring AP is not "available"), the processor 104 of the AP 100 will allow the association. In this case, referring to FIG. 5, if an MD Type is "g" and radio (2) mode of the AP is "n" and there is no neighbor AP with radio mode "g", the AP will allow client to get associated and set its radio mode to "gin" (mixed mode) as shown in FIG. 6 in order to accommodate the MD.

Issues do arise in the above scenario, in that a neighboring AP may be compelled to accept more and more legacy APs, or may find itself in competition with its neighbors to shed itself of legacy MDs. Also, based on the load in a current operating channel, there is a possibility of multiple AP's simultaneously moving to mixed mode operation, in spite of Connection Time Mode Steering. Therefore, the present invention preferably envisions a concept of Clean Up Mode Steering.

Clean Up Mode Steering attempts to bring some of the mixed mode AP's to single mode operation based on a hysteresis of client distribution in the network. Clean Up Mode Steering refers to a technique for an AP operating in mixed mode to move to a single mode due to a low ratio of legacy to non-legacy clients along with lower legacy client counts. In effect, a legacy MD which was forcing an AP to operate in mixed mode will be forcibly cleared or de-authenticated from service, once it is ensured that there is a reachable neighbor AP 110 operating in mixed mode. This is helpful in those cases where an AP is forced to move into mixed mode operation (which happens even when applying Connection Time Mode Steering), where a single mode AP is not allowed to deny an association of a legacy MD and must then accept mixed mode operation to associate that MD. However, after sometime, if the legacy client to non-legacy client ratio (i.e. client load) drops below a defined threshold, Clean Up Mode Steering will allow the AP to move back to single mode by steering the MD away from the AP 100.

In the case where the AP 100 is operating in at least two different operational modes, if a ratio of (legacy) mobile devices operating at a less than highest throughput mode to (non-legacy) mobile devices operating at the highest throughput mode (i.e. client load) is greater than a threshold, the processor 104 of the AP 100 continues operating in mixed mode. If the client load is less than a threshold then further conditions, below, must be tested.

If no neighboring access point has an available operational mode matching the operational mode of one of the mobile devices, the processor 104 of the AP 100 will continue to support that one mobile device 120 in mixed mode. Otherwise, if any neighboring access point 110 has an available operational mode matching the operational mode of one of the mobile devices, the processor 104 of the AP 100 can clear that mobile device from its service and move to a higher operational mode.

If the cleared mobile device was the last legacy mobile device being served by the AP, i.e. the client load ratio is zero, then the processor 104 of the AP 100 can switch back to single mode operation. In other words, once all legacy mobile devices have been cleared, the processor 104 of the AP 100 will operate at the highest throughput single mode only.

Figure 2:
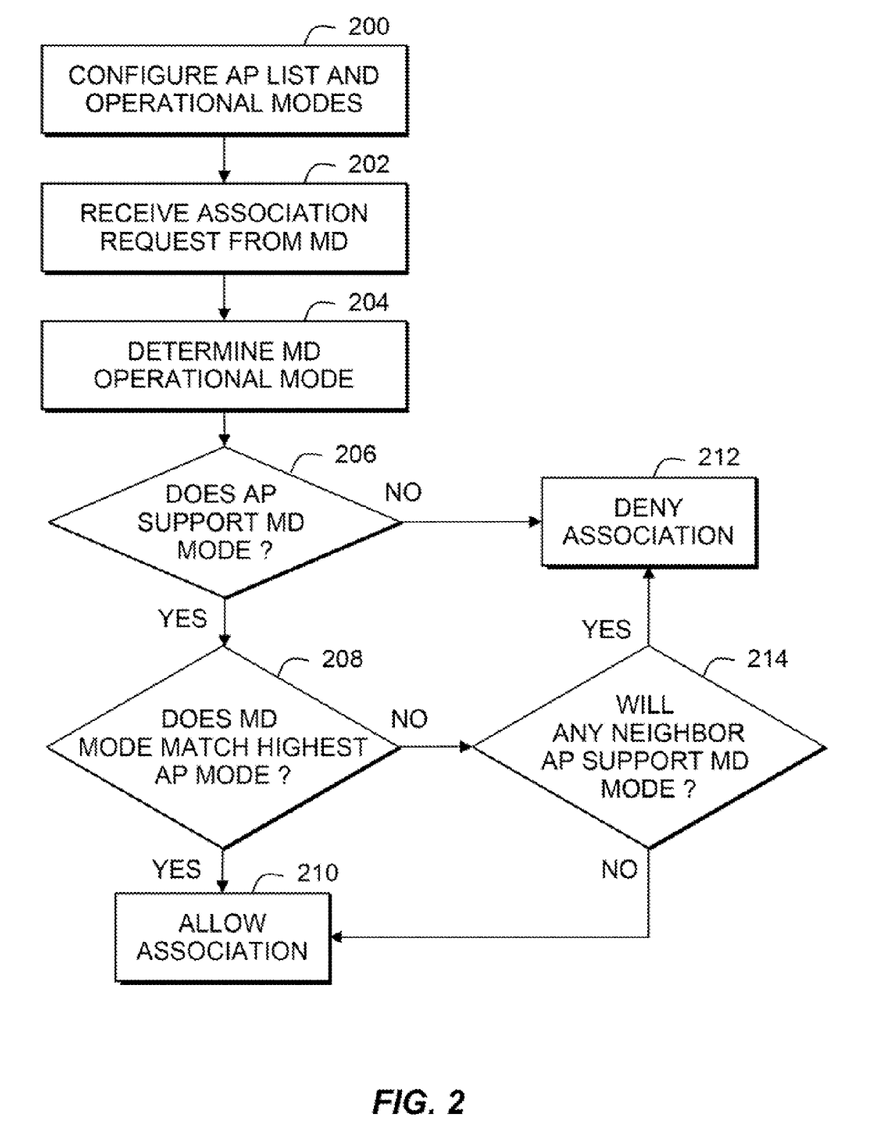
FIG. 2 is a simplified block diagram of a method, in accordance with one embodiment of the present invention.

FIG. 2 illustrates a flowchart of a method for mode steering in a wireless communication network, in accordance with the present invention. In this example, the present invention provides a Connection Time mode Steering function.

The method starts by configuring 200 a list of neighboring access points and their available operational modes by an access point. The list can also include an "availability" indication. This indication indicates whether an access point is willing to support a legacy mobile device.

A next step includes receiving 202 a request for association from a mobile device by the access point.

A next step includes determining 204 an operational mode of the mobile device by the access point.

If the operational mode of the mobile device does not match any operational mode of the access point 206, a next step includes denying 212 or disallowing the association. Denying or disallowing an association is used in the method for providing the opportunity for an MD to associate with a neighbor AP.

If the operational mode of the mobile device matches a highest throughput operational mode of the access point 208, a next step includes allowing 210 the association.

If the operational mode of the mobile device is a lower throughput operational mode than the highest throughput operation mode of the access point 208, and if any neighboring access point has an operational mode matching the operational mode of the mobile device and is operating in at least two different operational modes 214, a next step includes denying 212 or disallowing the association. Optionally, the AP can also determine whether the neighboring AP is "available", as defined herein, wherein only if the neighboring AP is "available" proceeding to deny or disallow an association.

Otherwise the access point allows the association. In other words, if the operational mode of the mobile device is a lower throughput operational mode than the highest throughput operation mode of the access point 208, and if no neighboring access point has an available operational mode matching the operational mode of the mobile device and is operating in at least two different operational modes 214, (or if the neighboring AP is not "available"), allowing 210 the association.

Figure 3:
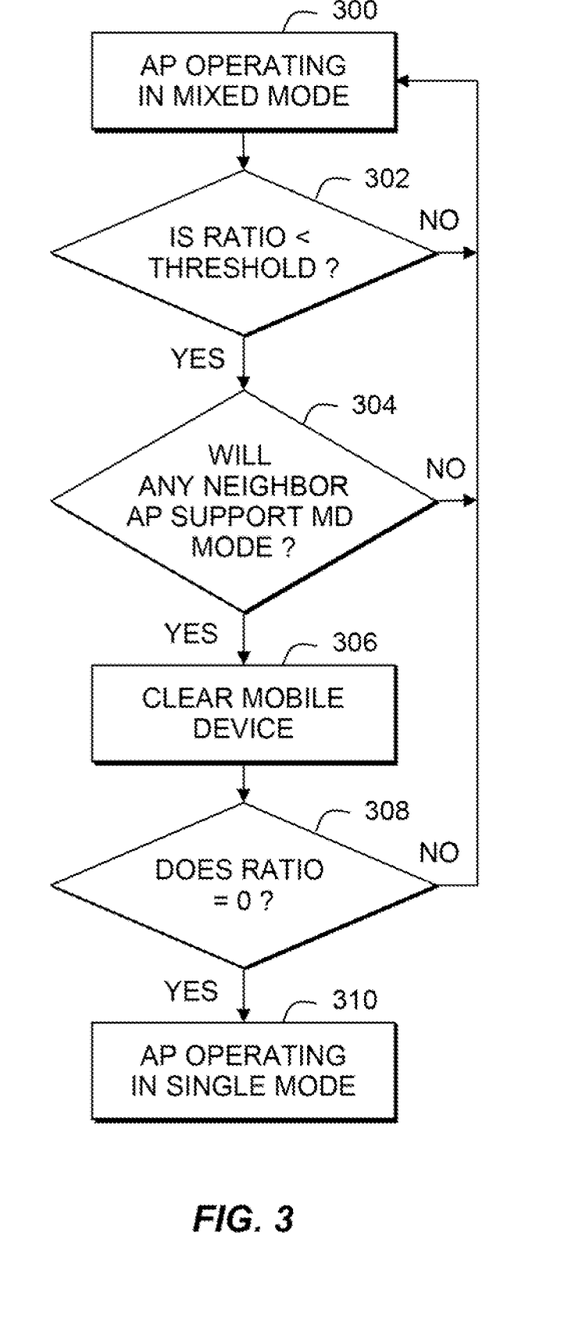
FIG. 3 is a simplified block diagram of a method, in accordance with a further embodiment of the present invention.

FIG. 3 illustrates a flowchart of a continuation of the method of FIG. 2. In this example, the present invention provides a Clean up function.

The method continues in the case where the AP is operating in at least two different operational modes 300, i.e. a mixed mode of operation.

If a ratio of mobile devices operating at a less than highest throughput operational mode to mobile devices operating at the highest throughput mode is greater than a threshold 302, the AP continues operating in mixed mode 300. If the ratio of mobile devices operating at a less than highest throughput mode to mobile devices operating at the highest throughput mode is less than a threshold 302, the method continues.

If no neighboring access point has an available operational mode matching the operational mode of one of the mobile devices 304, the AP will continue to support that one mobile device in mixed mode 300. Otherwise, if any neighboring access point has an available operational mode matching the operational mode of one of the mobile devices 304, the access point can clear 306 that mobile device from its service.

If the cleared mobile device was the last lower throughput mobile device being served by the AP, i.e. the ratio is zero 308, then the AP can switch back to single mode (higher operational mode) operation 310. In other words, once all mobile devices operating at less than highest throughput mode have been cleared, the access point will operate at the highest throughput single mode only.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs for ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for mode steering in a wireless communication network, the method comprising the steps of:
    configuring a list of neighboring access points and their operational modes by an access point;
    receiving a request for association from a mobile device by the access point;
    determining an operational mode of the mobile device by the access point;
    wherein if the operational mode of the mobile device does not match any operational mode of the access point, denying the association, and
    wherein if the operational mode of the mobile device matches a highest throughput operational mode of the access point, allowing the association, and
    wherein if the operational mode of the mobile device is a lower throughput operational mode than the highest throughput operation mode of the access point, and if any neighboring access point has an available operational mode matching the operational mode of the mobile device, denying the association, and otherwise allowing the association.

2. The method of claim 1, wherein the next to last step includes; wherein if the operational mode of the mobile device is a lower throughput operational mode than the highest throughput operation mode of the access point, and if any neighboring access point has an available operational mode matching the operational mode of the mobile device and is operating in at least two different operational modes, denying the association.

3. The method of claim 1, wherein configuring includes initializing default operating modes for the access points, and maintaining a table for each access point, wherein the table includes each access point's operating modes and an indication of each access point's availability.

4. The method of claim 3, wherein the access point will maintain a table for itself and the neighboring access points.

5. The method of claim 3, wherein the last step includes; wherein if the operational mode of the mobile device is a lower throughput operational mode than the highest throughput operation mode of the access point, and if any neighboring access point has an available operational mode matching the operational mode of the mobile device and is available, denying the association, and otherwise allowing the association.

6. The method of claim 3, wherein an access point is available if a client load from the table is less than a threshold from the table.

7. The method of claim 3, wherein an access point is available if the table includes an indication that the access point is reachable through pre-authentication messaging.

8. The method of claim 1, wherein if the access point is operating in at least two different operational modes, and if a ratio of mobile devices operating at a less than highest throughput mode to mobile devices operating at the highest throughput mode is less than a threshold, and if any neighboring access point has an available operational mode matching the operational mode of one of the mobile devices, further comprising clearing that mobile device from service.

9. The method of claim 8, wherein once all mobile devices operating at less than highest throughput mode have been cleared, further comprising operating the access point at the highest throughput single mode only.

10. An access point operable for mode steering in a wireless communication network, the access point comprising:
a memory operable to be configured with a list of neighboring access points and their operational modes;
a transceiver operable to receive a request for association from a mobile device; and
a processor coupled to the memory and transceiver, the processor operable to determine an operational mode of the mobile device; wherein if the operational mode of the mobile device does not match any operational mode of the access point, denying the association, and wherein if the operational mode of the mobile device matches a highest throughput operational mode of the access point, allowing the association, and wherein if the operational mode of the mobile device is a lower throughput operational mode than the highest throughput operation mode of the access point, and if any neighboring access point has an available operational mode matching the operational mode of the mobile device, denying the association, and otherwise allowing the association.

11. The access point of claim 10, wherein the processor is operable such that; wherein if the operational mode of the mobile device is a lower throughput operational mode than the highest throughput operation mode of the access point, and if any neighboring access point has an available operational mode matching the operational mode of the mobile device and is operating in at least two different operational modes, the processor will deny the association.

12. The access point of claim 10, wherein the memory is operable to be configured with initialized default operating modes for the access points, and to maintain a table for each access point, wherein the table includes each access point's operating modes and an indication of each access point's availability.

13. The access point of claim 12, wherein the access point will maintain a table for itself and the neighboring access points.

14. The access point of claim 12, wherein the processor is operable such that; wherein if the operational mode of the mobile device is a lower throughput operational mode than the highest throughput operation mode of the access point, and if any neighboring access point has an available operational mode matching the operational mode of the mobile device and is available, the processor will deny the association, and otherwise allow the association.

15. The access point of claim 12, wherein an access point is available if a client load from the table is less than a threshold from the table.

16. The access point of claim 12, wherein an access point is available if the table includes an indication that the access point is reachable through pre-authentication messaging.

17. The access point of claim 10, wherein if the access point is operating in at least two different operational modes, and if a ratio of mobile devices operating at a less than highest throughput mode to mobile devices operating at the highest throughput mode is less than a threshold, and if any neighboring access point has an available operational mode matching the operational mode of one of the mobile devices, the processor will clear that mobile device from its service.

18. The access point of claim 17, wherein once all mobile devices operating at less than highest throughput mode have been cleared, the access point will operate at the highest throughput single mode only.

19. A wireless local area network including an access point operable for mode steering in a wireless communication network and at least one neighboring access point, the access point comprising:
a memory operable to be configured with a list of neighboring access points and their available operational modes;
a transceiver operable to receive a request for association from a mobile device; and
a processor coupled to the memory and transceiver, the processor operable to determine an operational mode of the mobile device; wherein if the operational mode of the mobile device does not match any operational mode of the access point, denying the association, and wherein if the operational mode of the mobile device matches a highest throughput operational mode of the access point, allowing the association, and wherein if the operational mode of the mobile device is a lower throughput operational mode than the highest throughput operation mode of the access point, and if any neighboring access point has an available operational mode matching the operational mode of the mobile device, denying the association, and otherwise allowing the association.

* * * * *